US012120564B2

(12) United States Patent
Cui et al.

(10) Patent No.: US 12,120,564 B2
(45) Date of Patent: Oct. 15, 2024

(54) RACH CONFIGURATION IN L1/L2 MOBILITY

(71) Applicant: APPLE INC., Cupertino, CA (US)

(72) Inventors: Jie Cui, Cupertino, CA (US); Dawei Zhang, Cupertino, CA (US); Hong He, Cupertino, CA (US); Huaning Niu, Cupertino, CA (US); Manasa Raghavan, Cupertino, CA (US); Qiming Li, Beijing (CN); Xiang Chen, Cupertino, CA (US); Yang Tang, Cupertino, CA (US); Haitong Sun, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 371 days.

(21) Appl. No.: 17/593,413

(22) PCT Filed: Apr. 2, 2021

(86) PCT No.: PCT/CN2021/085164
§ 371 (c)(1),
(2) Date: Sep. 17, 2021

(87) PCT Pub. No.: WO2022/205397
PCT Pub. Date: Oct. 6, 2022

(65) Prior Publication Data
US 2023/0232290 A1 Jul. 20, 2023

(51) Int. Cl.
*H04W 36/00* (2009.01)
*H04W 74/0833* (2024.01)

(52) U.S. Cl.
CPC ... *H04W 36/0077* (2013.01); *H04W 36/0016* (2013.01); *H04W 74/0833* (2013.01)

(58) Field of Classification Search
CPC ............. H04W 36/08; H04W 36/0077; H04W 36/0016; H04W 36/0061; H04W 36/0072;
(Continued)

(56) References Cited

U.S. PATENT DOCUMENTS

| 2018/0092054 A1 | 3/2018 | Azarian et al. |
| 2020/0389897 A1 | 12/2020 | Mondal et al. |

(Continued)

FOREIGN PATENT DOCUMENTS

| KR | 20170054261 A | 5/2017 |
| WO | 2017173037 A1 | 10/2017 |

(Continued)

OTHER PUBLICATIONS

ETSI MCC, "Report of 3GPP TSG RAN2#108 meeting, Reno, USA", R2-2000009, 3GPP TSG-RAN WG2 meeting #109-e, Agenda Item 2.2, Nov. 18-22, 2019, 323 pages.

(Continued)

*Primary Examiner* — Quoc Thai N Vu
(74) *Attorney, Agent, or Firm* — Dorsey & Whitney LLP

(57) ABSTRACT

Devices, systems, and methods for Random Access Channel (RACH) configuration in Layer 1 (L1)/Layer 2 (L2) mobility. A user equipment (UE) may obtain a downlink (DL) Transmission Configuration Indicator (TCI) list from a first Transmission and Reception Point (TRP). The DL TCI list may include DL beam information, RACH Occasion (RO) information, and initial Bandwidth Part (BWP) information associated with each DL TCI of a plurality of DL TCIs related to the first TRP and multiple TRPs adjacent to the first TRP. The UE may receive a handover command from the first TRP via Downlink Control Information (DCI) in L1 or Media Access Control (MAC) Control Element (CE) in L2. The handover command indicates a handover from the first TRP to a second TRP of the multiple TRPs for the UE, (Continued)

and includes a specified DL TCI related to the second TRP. The UE may determine RACH information related to the second TRP, based at least partly on the specified DL TCI related to the second TRP included in the handover command and the DL TCI list. The UE may then perform random access to the second TRP based on the RACH information related to the second TRP. The RACH information may include uplink (UL) beam information, RO information and Bandwidth Part (BWP) information for the UE to perform random access to the second TRP.

20 Claims, 9 Drawing Sheets

(58) Field of Classification Search
CPC ......... H04W 74/0833; H04W 36/0055; H04W 74/008; H04B 7/063; H04B 7/0639; H04B 7/06966; H04L 5/001; H04L 5/0048; H04L 5/0053; H04L 5/0023
See application file for complete search history.

(56) References Cited

U.S. PATENT DOCUMENTS

| | | | |
|---|---|---|---|
| 2021/0195650 A1* | 6/2021 | Zhang | H04W 72/0446 |
| 2023/0164647 A1* | 5/2023 | Tao | H04W 36/08 |
| | | | 370/331 |
| 2023/0318693 A1* | 10/2023 | Bi | H04W 16/28 |
| | | | 370/329 |

FOREIGN PATENT DOCUMENTS

| | | |
|---|---|---|
| WO | 2020122581 A1 | 6/2020 |
| WO | 2020150699 A1 | 7/2020 |

OTHER PUBLICATIONS

PCT/CN2021/085164, International Search Report and Written Opinion, Dec. 28, 2021, 8 pages.

* cited by examiner

FIG. 6

```
PRACH-ResourceDedicatedBFR ::=    CHOICE {
    ssb                               BFR-SSB-Resource,
    csi-RS                            BFR-CSIRS-Resource
}

BFR-SSB-Resource ::=              SEQUENCE {
    ssb                               SSB-Index,
    ra-PreambleIndex                  INTEGER (0..63),
    ...
}

BFR-CSIRS-Resource ::=            SEQUENCE {
    csi-RS                            NZP-CSI-RS-ResourceId,
    ra-OccasionList                   SEQUENCE (SIZE(1..maxRA-OccasionsPerCSIRS)) OF INTEGER (0..maxRA-Occasions-1)    OPTIONAL,    -- Need R
    ra-PreambleIndex                  INTEGER (0..63)                                                                  OPTIONAL,    -- Need R
    ...
}
```

*FIG. 7*

RACH CONFIGURATION IN L1/L2 MOBILITY

FIELD

The present application relates to wireless communications, and more particularly to devices, systems, and methods for Random Access Channel (RACH) configuration in Layer 1 (L1)/Layer 2 (L2) mobility, e.g., in fifth generation (5G) new radio 5G (NR) systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including 5G NR communication. Accordingly, improvements in the field in support of such development and design are desired.

SUMMARY

Embodiments are presented herein of devices, systems, and methods for RACH configuration in L1/L2 mobility. The present disclosure is directed to several critical issues for RACH configuration in L1/L2 mobility. These critical issues for RACH configuration include determinations of uplink (UL) beam information, RACH Occasion (RO) information and Bandwidth Part (BWP) information to perform random access to the target cell.

According to the techniques described herein, a wireless device, such as a user equipment (UE), may be configured to obtain a downlink (DL) Transmission Configuration Indicator (TCI) list from a first Transmission and Reception Point (TRP). The DL TCI list may include DL beam information, RO information, and initial BWP information associated with each DL TCI of a plurality of DL TCIs related to the first TRP and multiple TRPs adjacent to the first TRP. The UE may receive a handover command from the first TRP via Downlink Control Information (DCI) in L1 or Media Access Control (MAC) Control Element (CE) in L2. The handover command indicates a handover from the first TRP to a second TRP of the multiple TRPs for the UE, and includes a specified DL TCI related to the second TRP. The UE may determine RACH information related to the second TRP, based at least partly on the specified DL TCI related to the second TRP included in the handover command and the DL TCI list. The UE may then perform random access to the second TRP based on the RACH information related to the second TRP. The RACH information may include UL beam information, RO information and BWP information for the UE to perform random access to the second TRP.

According to the techniques described herein, a network entity, such as a first TRP, may be configured to preconfigure a DL TCI list and transmit the DL TCI list to a UE. The DL TCI list may include DL beam information, RO information, and initial BWP information associated with each DL TCI of a plurality of DL TCIs related to the first TRP and multiple TRPs adjacent to the first TRP. The first TRP may transmit a handover command to the UE via DCI in L1 or MAC CE in L2. The handover command indicates a handover from the first TRP to a second TRP of the multiple TRPs for the UE, and includes a specified DL TCI related to the second TRP. These operations may cause the U E to determine RACH information related to the second TRP, based at least partly on the specified DL TCI related to the second TRP included in the handover command and the DL TCI list, and cause the UE to perform random access to the second TRP based on the RACH information related to the second TRP. The RACH information may include UL beam information, RO information and BWP information for performing RACH.

Thus, the techniques described herein may be used to address several open issues for RACH configuration in L1/L2 mobility.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 6 shows the relation between RO information and Synchronization Signal Block (SSB) in RACH configuration during L3 handover;

FIG. 7 shows the relation between RO information and Channel State Information Reference Signal (CSI-RS) in RACH configuration during L3 Beam Failure Recovery (BFR);

Figure 1:
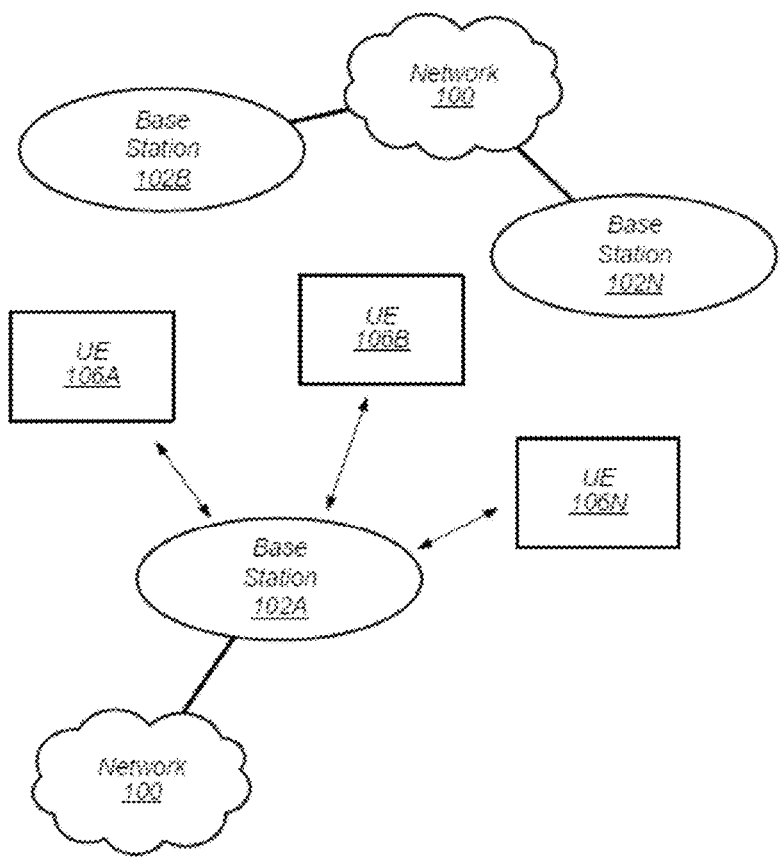
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
BWP: Bandwidth Part
DL: Downlink
UL: Uplink
Tx: Transmit
Rx: Receive
LTE: Long Term Evolution
NR: New Radio
5GS: 5G System
5GC/5GCN: 5G Core Network
IE: Information Element
CE: Control Element
MAC: Medium Access Control
RACH: Random Access Channel
RAR: Random Access Response
RO: RACH Occasion
SSB: Synchronization Signal Block
CSI-RS: Channel State information Reference Signal
PDCCH: Physical Downlink Control Channel
PDSCH: Physical Downlink Shared Channel
RRC: Radio Resource Control
RRM: Radio Resource Management
RS: Reference Signal
RSRP: Reference Signal Received Power
CORESET: Control Resource Set
TCI: Transmission Configuration indicator
DCI: Downlink Control Indicator
QCL: Quasi Co-Location
TA: Timing Advance Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Communication Device—any of various types of computer systems or devices that perform communications, where the communications can be wired or wireless. A communication device can be portable (or mobile) or may be stationary or fixed at a certain location. A wireless device is an example of a communication device, A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to," Reciting a component that is configured to perform one or more tasks is expressly intended not to invoke 35 U.S.C. § 112(f) interpretation for that component.

Figure 2:
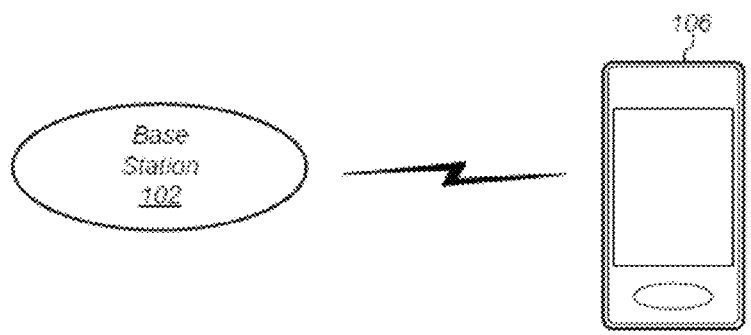
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
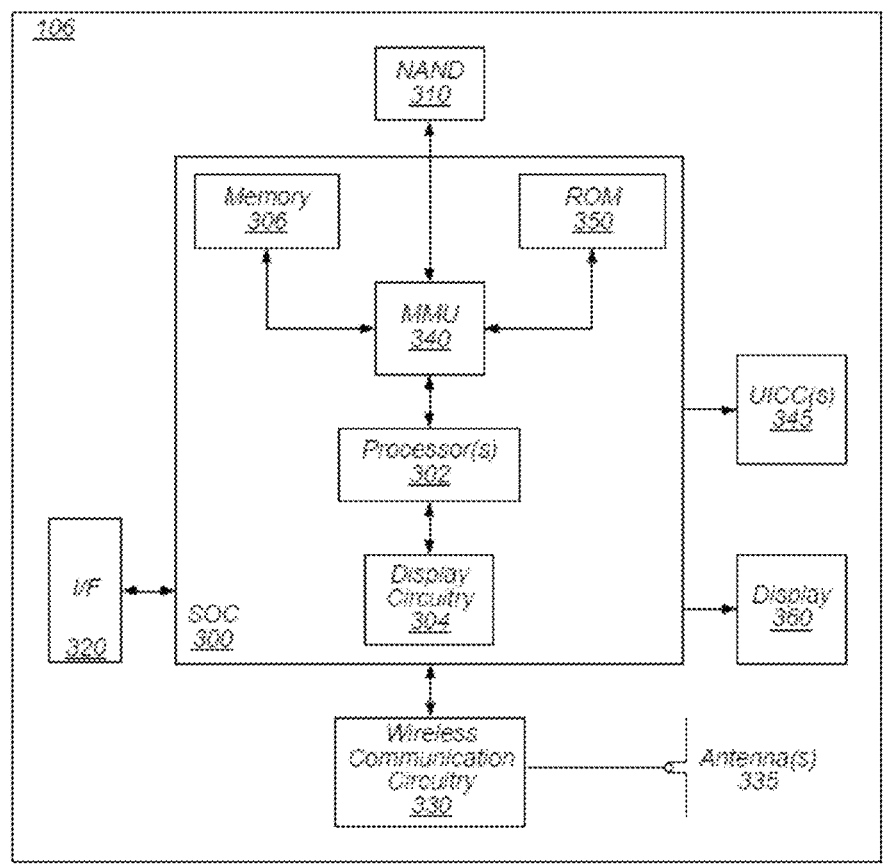
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
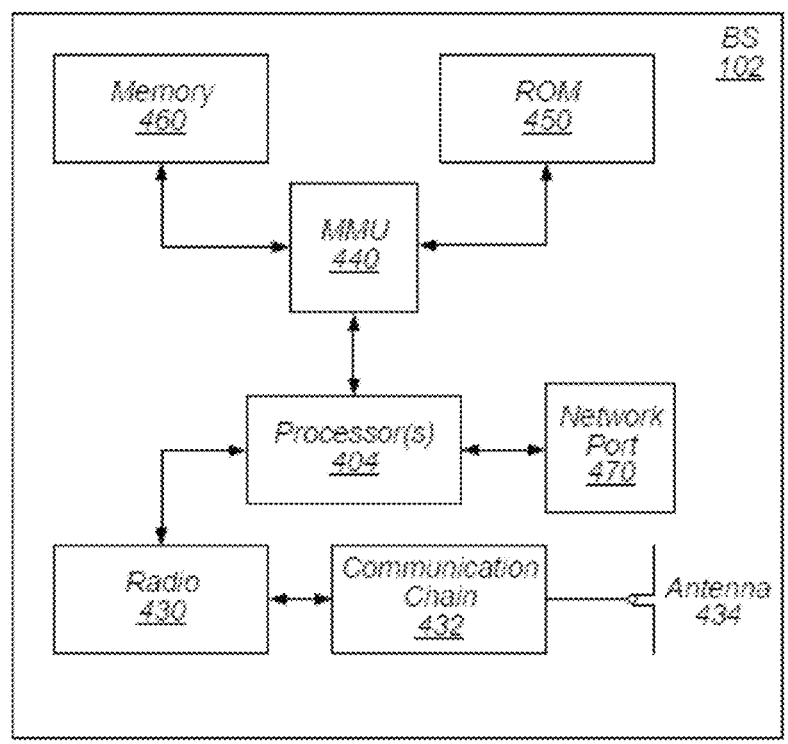
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UNITS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
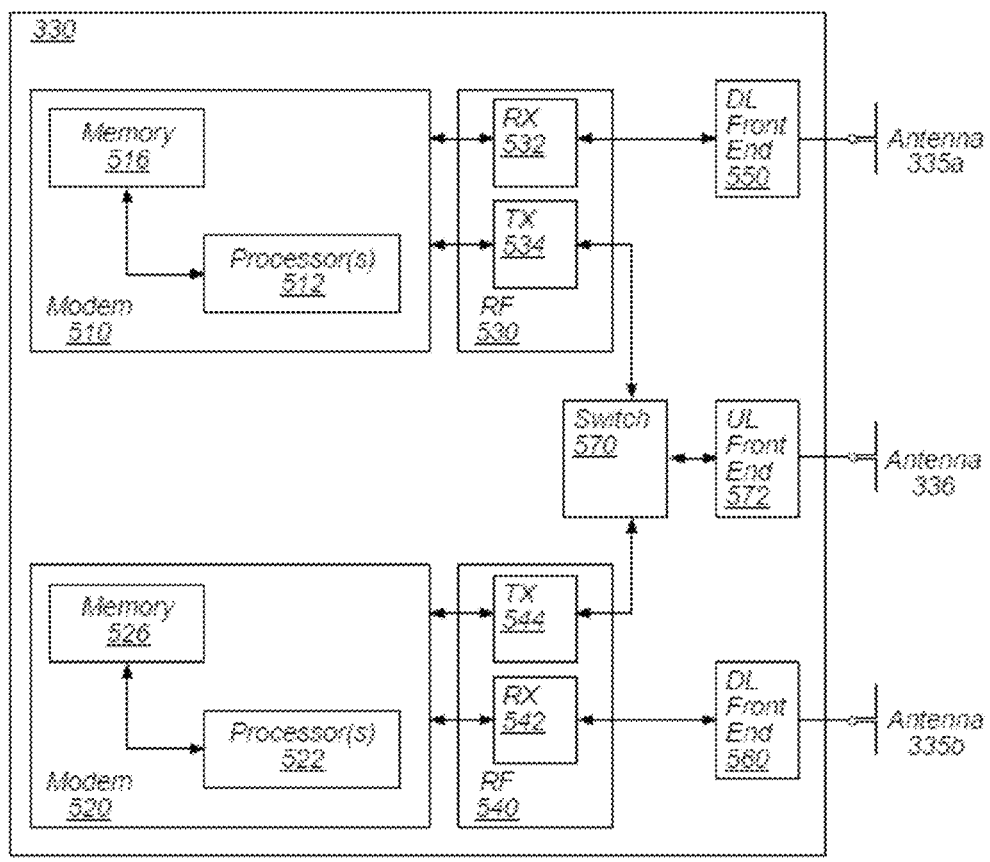
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein. e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits OCs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Overview of Handover

As mentioned above, a UE is capable of receiving signals from its serving cell and one or more neighboring cells. Different cells may have overlapping coverage areas. Due to the mobility of the UE, a cell change or cell handover might be required. For example, when the UE moves into an overlapping area between its serving cell and a neighboring cell, or even moves outside of the serving cell, this UE is likely to suffer from Quality of Service (QoS) degradation (such as a decrease in data rates). Therefore, a handover from the serving cell (also referred to as old cell herein) to a target cell (also referred to as new cell herein) for the UE should be conducted. That is, the UE needs to disconnect with the TRP in the old cell, and establish a connection with the TRP in the new cell, in order to access to the new cell. Since the communications between a UE and a cell is achieved by the transmissions between a TRP in this cell and the UE, thus this "TRP" and its respective "cell" could be used interchangeably hereinafter in handover procedure unless otherwise indicated.

According to 3GPP technical specification of 38 series, there are three layers in LTE and NR systems, including Layer 1 (L1); physical (PHY) layer; Layer (L2); Medium Access Control (MAC) layer; and Layer 3 (L3); Radio Resource Control (RRC) Layer. Conventionally, a cell handover for a UE is conducted mainly in L3. According to Further Enhance MIMO (FeMIMO) work item (WI), L1/L2 mobility has been introduced for the UE to change the cell to simplify the handover procedure. In order to perform a cell change or handover via L1/L2, it is necessary to consider if the UE needs to perform random access to the new cell in case the Timing Advance (TA) may not be reused from the old cell (or respective TRP in the old cell) to the new cell (or respective TRP in the new cell). Currently, there is no specific method or procedure for RACH configuration defined in L1/L2 mobility according to existing standards.

Figure 6:
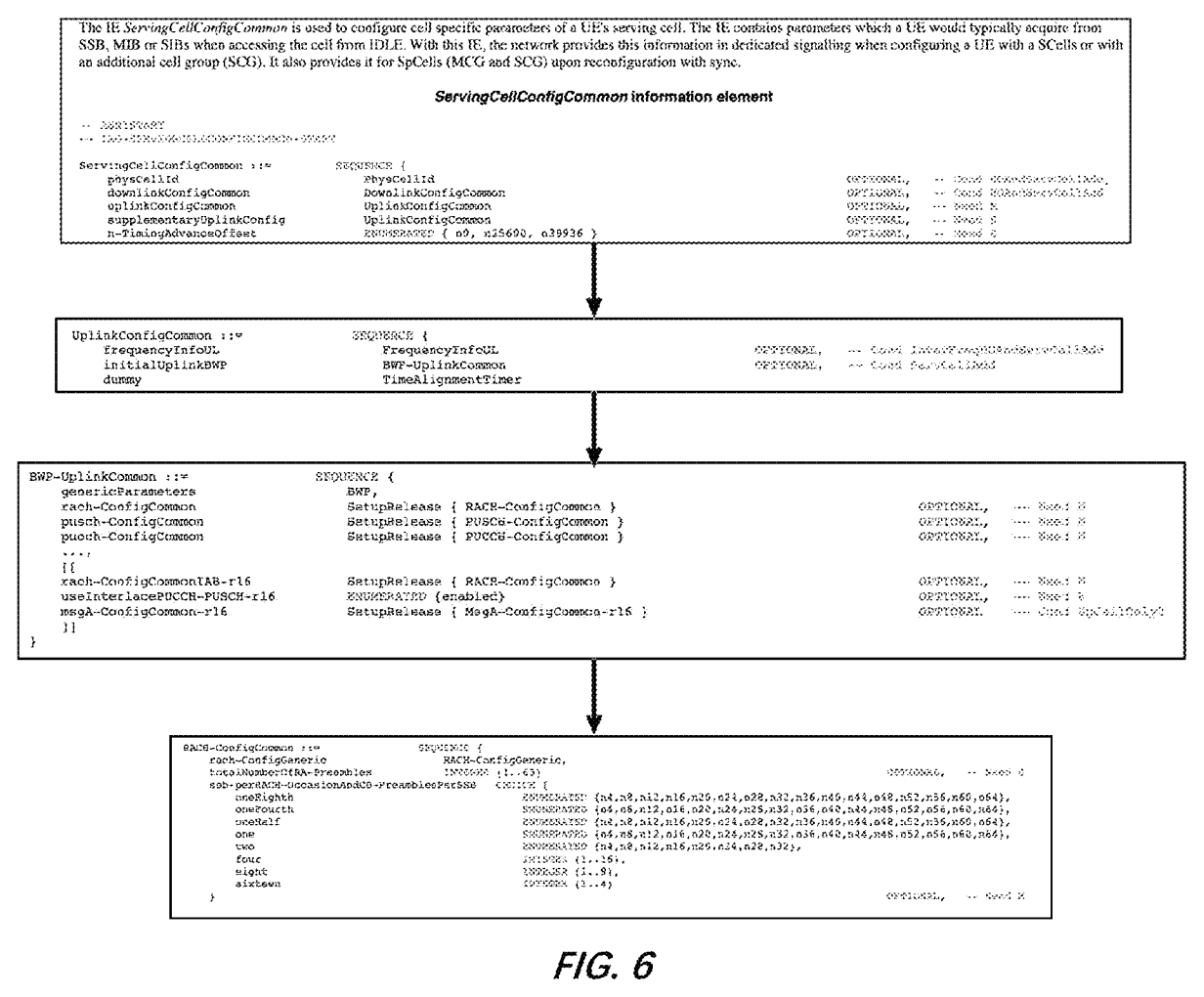

FIGS. 6-7—Legacy L3 Handover and RACH

In legacy L3 handover, RACH Occasion (RO) information associated with SSB has been configured to a UE in L3 RRC handover command. FIG. 6 shows the relation between RO information and SSB in RACH configuration during L3 handover. As an example, RO information may include SSB number per RO, preamble, and timing/frequency information, etc. Currently, only the relation between RO information and SSB has been configured in L3 mobility, while there is no specific configuration for the relation between RO information and CSI-RS in L3 mobility. As shown in FIG. 7, the relation between RO information and CSI-RS has only been configured for a Beam Failure Recovery (BFR) scenario, which is different from a handover scenario.

In L1/L2 mobility, both SSB and CSI-RS may be configured as TCI-RS. By conducting a TCI switching based handover, the relation between SSB/CSI-RS and RO information shall be supported. In addition, critical elements for RACH configuration, such as RO information, BWP information and UL beam information, are separately configured during L3 handover. By contrast, in L1/L2 handover, it is possible to determine all these elements for RACH configuration together with the assistance of a DL TCI list and a TCI switching based handover command. In L1/L2 handover, the TCI switching based handover command may be transmitted from the TRP in the serving cell to the UE via DCI in L1 or MAC CE in L2.

Figure 8:
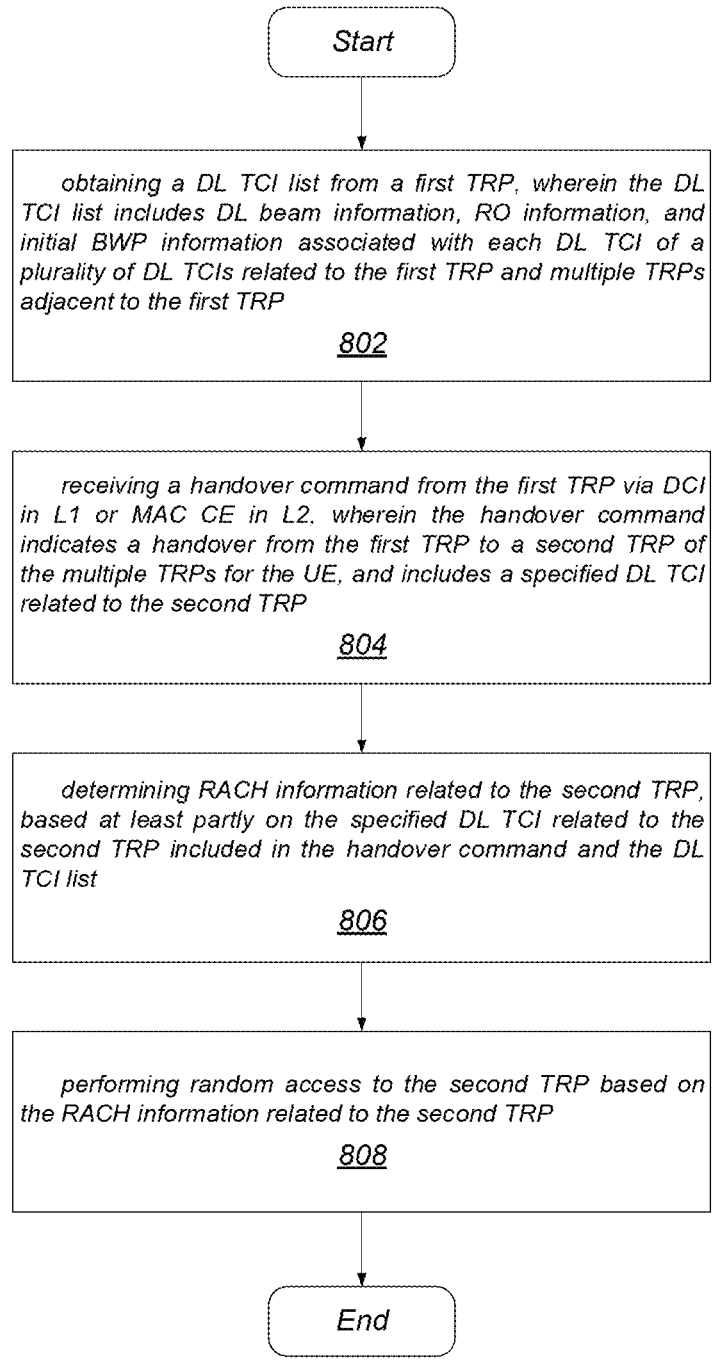
FIG. 8 is a flowchart diagram illustrating an example method for a UE for RACH configuration in L1/L2 mobility, according to some embodiments.

FIG. 8—Method for RACH Configuration for UE in L1/L2 Mobility

As part of the development of RACH configuration for a UE in L1/L2 mobility, it would be useful to provide a method for determining RACH information for the UE that can support such a technique.

Accordingly, FIG. 8 shows a flowchart diagram illustrating an example method for a UE for RACH configuration in L1/L2 mobility, at least according to some embodiments.

Aspects of the method of FIG. 8 may be implemented by a wireless device such as a UE illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. As shown, the method of FIG. 8 may operate as follows.

At 802, a UE may obtain a DL TCI list from a first TRP. The DL TCI list may include DL beam information, RO information, and initial BWP information associated with each DL TCI of a plurality of DL TCIs related to the first TRP and multiple TRPs adjacent to the first TRP. At 804, the UE may receive a handover command from the first TRP via DCI in L1 or MAC CE in L2. The handover command may indicate a handover from the first TRP to a second TRP of the multiple TRPs for the UE, and may include a specified DL TI related to the second TRP. At 806, the UE may determine RACH information related to the second TRP, based at least partly on the specified DL TCI related to the second TRP included in the handover command and the DL TCI list. At 808, the UE may perform random access to the second TRP based on the RACH information related to the second TRP.

It should be understood that in various embodiments, some of the elements of the methods shown may be performed concurrently, in a different order than shown, may be substituted for by other method elements, or may be omitted. Additional elements may also be performed as desired. It will be appreciated that the terms "first" and "second" in the present disclosure do not necessarily define a sequential relation or priority relation.

DL TCI List

According to embodiments of the present disclosure, a novel DL TCI list may be pre-configured by a network, and then be provided to a UE before L1/L2 handover. As an example, the DL TCI list may be generated by the TRP in the serving cell of the UE and transmitted to the UE. UE may obtain and store the DL TCI list locally for later use. An exemplary DL TCL list is shown in Table 1.

TABLE 1

Exemplary DL TCI List

| DL TCI Index | DL Beam Information | RO Information | Initial BWP Information |
|---|---|---|---|
| DL TCI #1 | CSI-RS #1 of cell 1 | RO information #1 | initial BWP of cell 1 |
| DL TCI #2 | SSB #1 of cell 2 | RO information #2 | Initial BWP of cell 2 |
| DL TCI #3 | CSI-RS #2 of cell 2 | RO information #3 | Initial BWP of cell 2 |
| DL TCI #4 | CSI-RS #1 of cell 3 | RO information #4 | Initial BWP of cell 3 |
| ... | ... | ... | ... |

Normally, a conventional DL TCI list may only contain DL beam information associated with a measurement of SSB or CSI-RS in the serving cell (e.g., cell 1). By contrast, the DL TCI list according to embodiments of the present disclosure may include DL beam information related to the serving cell and multiple cells (such as cell 2 and cell 3) adjacent to cell 1. These multiple cells, such as cell 2 and cell 3, are candidate cells for the UE to perform L1/L2 handover from cell 1. In addition to the DL beam information, the DL TCI list disclosed herein may further include other types of information that might be useful for RACH configuration during L1/L2 handover.

Specifically, according to the DL TCI list shown in Table 1, one row shows a piece of TCI-related information with a unique DL TCI index, which is sometimes referred to as DL TCI for simplicity. The piece of TCI-related information indicates the cell (or respective TRP) this DL TCI relates to. The DL beam information in this row could be based on a previous measurement of one of SSB or CSI-RS associated with this DL TCI, which may indicate the DL Tx beam for the TRP of the cell this DL TCI relates to, and the DL Rx beam for the UE. The RO information may include one or more of the following related to this cell (or respective TRP): RACH time domain configuration; RACH frequency domain configuration; number of RACH; and power level of RACH. The initial BWP information in this row indicates the initial portion of UL bandwidth for UL transmissions related to this cell (or respective TRP).

It will be appreciated that the DL TCI list shown in Table 1 is by way of example and not by way of limitation. In practice, the DL TCI list may include more or less information that could be conceived by those skilled in the art.

Based on the above DL TCI list and a DL TCI switching based handover command (which indicates the old DL TCI and the new DL TCI) in L1/L2 mobility, the UE may determine RACH information necessary for random access. Determinations of three types of RACH information are described hereinafter, including UL beam information, RO information and BWP information, which enable the UE to perform random access to the new cell (or respective TRP) during L1/L2 handover.

Figure 9:
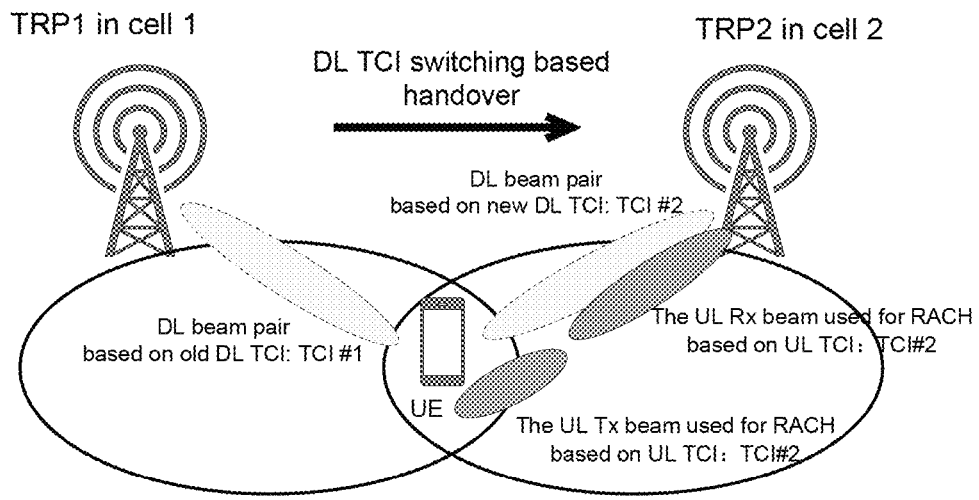
FIGS. 9-11 are schematic figures illustrating the methods for determining UL beam for a UE to perform RACH in L1/L2 mobility, according to some embodiments.
Figure 10:
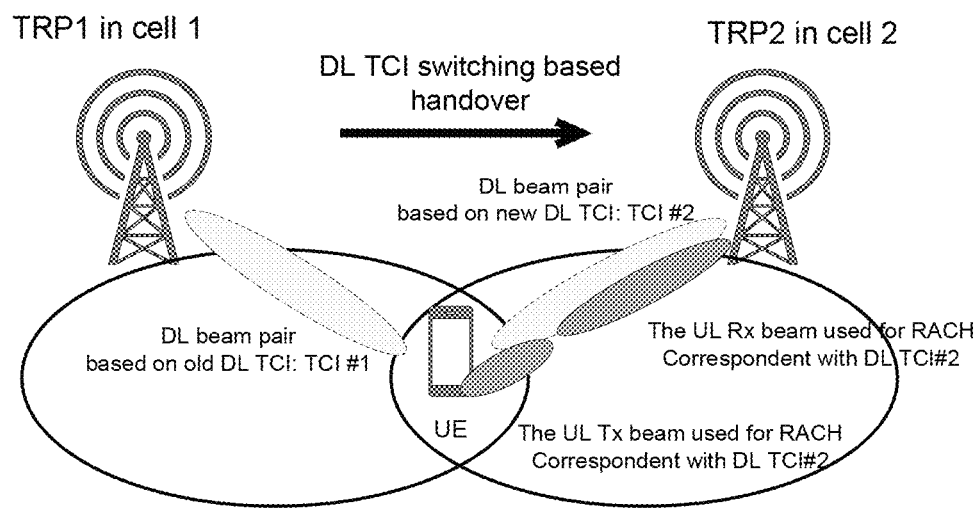
Figure 11:
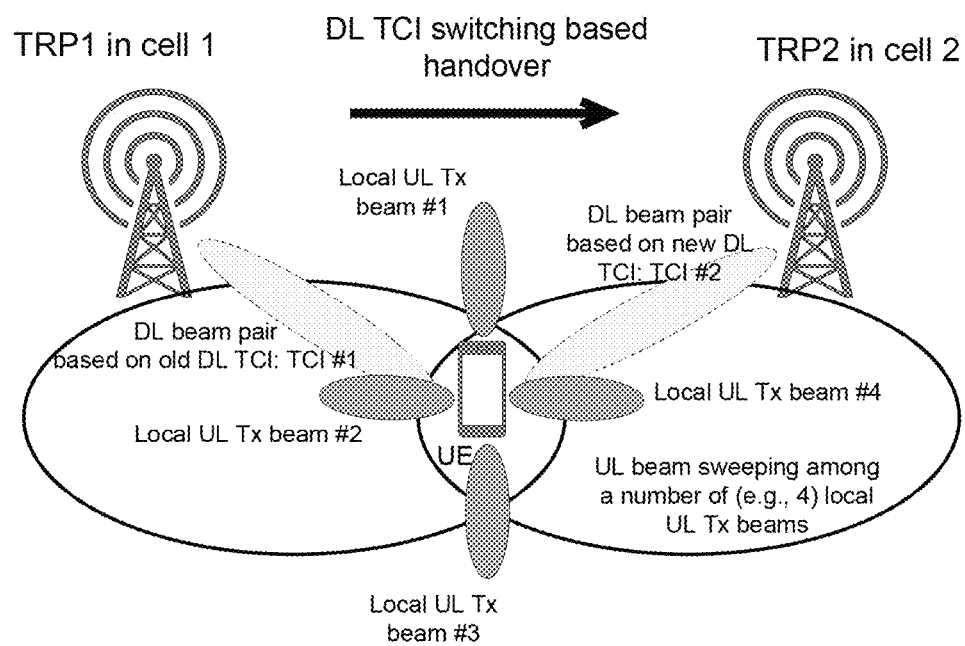

FIGS. 9-11—UL Beam Information for RACH

Since RACH procedure involves UL transmissions between the UE and the TRP in the target cell, thus the determination of UL beam information for RACH is critical. In L1/L2 mobility, the handover command is based on the DL TCI switching, which indicates a specified DL TCI related to the target cell (or respective TRP). With the knowledge of this specified DL TCI and DL TCI list, three options are provided to determine the UL beam information for RACH to the target cell (or respective TRP). FIGS. 9-11 illustrate three methods corresponding to three options for determining UL beam for a UE to perform RACH in L1/L2 mobility, according to some embodiments, respectively.

According to FIGS. 9-11, a scenario of L1/L2 handover from a serving cell (also called old cell), i.e., cell 1, to a target cell (also called new cell), i.e., cell 2, for the UE is illustrated. That is, the scenario in each of FIGS. 9-11 involves an L1/L2 handover from TRP1 to TRP2 for the UE. The handover command indicates that the old DL TCI is TCI #1, and the new DL TCI is TCI #2. The DL beam pair (including DL Tx beam for TRP and DL Rx beam for UE) associated with the old DL TCI and the new DL TCI are shown in dotted lines in each of these figures.

Option 1 Network Indicates UL Beam Information

In this option, a novel UL TC list (also called UL spatial relation information) may be pre-configured by the network, and then be provided to the UE before L1/L2 handover. As an example, the UL TCL list may be generated by the TRP in the serving cell of the UE and transmitted to the UE. LE may obtain and store the UL TCI list locally for later use. An exemplary UL TCL list is shown in Table 2.

TABLE 2

Exemplary UL TCI List
(or UL Spatial Relation Information)

| UL TCI Index | UL Beam Information |
|---|---|
| UL TCI #1 | SSB #2 of cell 1 |
| UL TCI #2 | CSI-RS #1 of cell 2 |
| UL TCI #3 | CSI-RS #2 of cell 2 |
| UL TCI #4 | SSB #1 of cell 2 |
| ... | ... |

The UL TCI list according to embodiments of the present disclosure may include UL beam information related to the serving cell and multiple cells (such as cell 2 and even cell 3 (not shown in Table 2)) adjacent to cell 1. These multiple cells (including cell 2) are candidate cells for the UE to perform L1/L2 handover from cell 1. Specifically, according to the UL TC list shown in Table 2, one row shows a piece of TI-related information with a unique UL TC index, which is sometimes referred to as UL TC for simplicity. The piece of TCI-related information indicates the cell (or respective TRP) this UL TCI relates to. The UL beam information in this row is based on a previous measurement of one of SSB, CSI-RS or SRS associated with this UL TCI, which may indicate the UL Tx beam for the UE, and the UL Rx beam for the TRP of the cell this UL TC relates to.

Referring to FIG. 9, in addition to receiving the DL TCI switching based handover command from TRP1 in cell 1, the UE further receives a specified UL TCI from TRP1 via DCI in L1 or MAC CE in L2. UE determines the UL beam information for RACH further based on this specified UL TCI and UL TCI list or UL spatial relation information. The UL beam information associated with the specified UL TC in the UL TC list or UL spatial relation information could be determined as the UL beam information for the UE to perform random access to TRP2 in cell 2.

According to this option, the network indicates to the UE which cell to handover (i.e., cell 2) through DL TCI switching based handover command, and the network also indicates which index of UL TCI could be used for the UE to perform random access to TRP2 in cell 2. As an example, TRP1 transmits a specified UL TCI: TCI #2 to the UE, and UE may use the UL beam information associated with UL TC #2 in the UL TC list or UL spatial relation information as shown in Table 2. The UE may use this UL beam information to generate its UL Tx beam for RACH to TRP2 in cell 2. It could be understood that the specified DL TCI included in the handover command and the specified UL TC may be transmitted to the UE in a single L1/L2 message, or in separate L1/L2 messages.

Additionally, the above operations could be based on a prerequisite that measurement results (e.g., measurement of SSB, CSI-RS or SRS) in the UL TCI list are not out-of-date. In other words, the UE should determine that the time elapsed since the measurement associated with the specified UL TCI was conducted does not exceed a time threshold.

To the contrary, if the UE determines that the time elapsed since the measurement associated with the specified UL TCI was conducted exceeds a time threshold, or the UE has never conducted the measurement associated with the specified UL TCI although the network indicated it to do so, the UE may need to perform beam tracking with respect to TRP2 in cell 2, in order to determine UL beam information for RACH. Specifically, the UE may use the beam resulted from the beam tracking as its UL Tx beam for RACH to the new cell (i.e., cell 2).

As an example, the above beam tracking could be based on QCLed RS of the target TC (i.e., the specified UL TC), which mainly involves DL beam tracking for the UE. The TRP2 may remain its DL beam corresponding to the UL beam associated with the specified UL TCI (e.g., UL TCI #2), and the UE may try multiple local DL beams for the measurement of QCLed RS of the target TCI. The UE may select one DL beam with the highest L1-RSRP measurement result, and use the UL beam (e.g., a reverse beam of the selected DL beam) corresponding to the selected DL beam as its UL Tx beam for RACH to the new cell. On the other hand, TRP2 may use the UL beam associated with UL TC #2 as UL Rx beam during RACH procedure.

It will be appreciated that the time threshold could be pre-determined by the network, or it could be varied according to current network conditions or user preference.

Option 2 Network Indicates DL Beam Information and UE Derives UI Beam Information In this option, referring to FIG. 10, a UE receives a DL TCI switching based handover command from TRP1 in cell 1 via DCI in L1 or MAC CE in L2. The handover command indicates a specified DL TCI related to TRP2 in cell 2. Based on the DL beam information associated with this specified DL TCI in the DL TCI list, the UE may determine the UL beam information for RACH through beam correspondence. In other words, the UL beam information corresponding to the DL beam information associated with the specified DL TCI related to the second TRP in the DL TO list is determined as the UL beam information for the UE to perform random access to TRP2 in cell 2.

As an example, TRP1 transmits a specified DL TCI: TCI #2 to the UE in L1/L2 handover command, and the UE may derive the UL beam information from DL beam information associated with DL TCI #2 in the DL TCI list shown in Table 1 based on beam correspondence. The UE may use this UL beam information to generate its UL Tx beam for RACH to TRP2 in cell 2. It will be appreciated to those skilled in the art that the beam correspondence refers to the ability of the UE to select a suitable beam for UL transmission based on DL measurements with or without relying on UL beam sweeping. For example, the UE may simply use a reverse beam of a DL beam as its UL beam due to channel reciprocity.

Additionally, the above operations could be based on a prerequisite that measurement results (e.g., measurement of SSB or CSI-RS) in the DL TCI list are not out-of-date. In other words, the UE should determine that the time elapsed since the measurement associated with the specified DL TCI was conducted does not exceed a time threshold.

To the contrary, if the UE determines that the time elapsed since the measurement associated with the specified DL TCI was conducted exceeds a time threshold, or the UE has never conducted the measurement associated with the specified DL TCI although the network indicated it to do so, the UE may need to perform beam tracking with respect to TRP2 in cell 2, in order to determine UL beam information for RACH. Specifically, the UE may use the beam resulted from the beam tracking as its UL Tx beam for RACH to the new cell (i.e., cell 2).

As an example, the above beam tracking could be based on SSB or CSI-RS of the target TC (i.e., the specified DL TCI), which mainly involves DL beam tracking for the UE. The TRP2 may remain its DL beam associated with the specified DL TCI (e.g., DL TCI #2), and the LE may try multiple local DL beams for the measurement of SSB or CSI-RS of the target TCI. The UE may select one DL beam with the highest L1-RSRP measurement result, and use the UL beam derived from the selected DL beam based on beam correspondence as its UL Tx beam for RACH to the new cell. Similarly. TRP2 may use the UL beam derived from its UL beam associated with DL TCI #2 based on beam correspondence as UL Rx beam during RACH procedure.

It will be appreciated that the time threshold could be pre-determined by the network, or it could be varied according to current network conditions or user preference.

Option 3 UE Performs UL Beam Sweeping to Determine UL Beam Information

In this option, referring to FIG. 11, a UE receives a DL TCI switching based handover command from TRP1 in cell 1 via DCI in L1 or MAC CE in L2. The handover command indicates a specified DL TCI (i.e., DL TCI #2) related to TRP2 in cell 2. UE performs UL beam sweeping with respect to TRP2 in cell 2. In other words, the UE may determine the UL beam information for RACH further based on the beam sweeping, and the UL beam information associated with the UL beam resulted from the beam sweeping is determined as the UL beam information for the UE to perform random access to TRP2 in cell 2.

In this option, the network does not configure the UL beam information for the UE to perform random access to the new cell (e.g., cell 2). The network does not assume that the UE may derive the UL beam information from the DL beam information based on the specified DL TCI. Instead, after the UE performs DL TCI switching after receiving the handover command, the UE uses its local UL Tx beams to perform UL beam sweeping to transmit RACH to TRP2 in cell2. The UE may stop UL beam sweeping until it receives RAR from TRP2.

As an example, at each RACH power level, the UE may try a number of (e.g., four) local Tx beams, and if the UE does not receive RAR from the network (or TRP2 in cell 2), then the UE may ramp up to a higher RACH power level and try a number of local Tx beams again. When the UE receives RAR from TRP2, it may determine the UL Tx beam achieving this RAR as the result of beam sweeping, and use this UL Tx beam for RACH.

It will be appreciated that during beam sweeping, TRP2 may also try a number of local UL Rx beams at the same time. Normally, the combination of UL Tx beam and UL Rx beam with the best alignment is likely to achieve RAR. It will also be appreciated that if the UE cannot receive any RAR from TRP2 after trying all RACH power levels on all local Tx beam directions, RACH might be failed.

According to some embodiments, Option 1 may be the preferred option among three options for determining UL beam for RACH. That is, it is preferred that the network directly indicates the UL beam information for the UE, which is time efficient and flexible, as well as suitable for comprehensive channel conditions.

RO Information for RACH

As mentioned above, RO information including timing, frequency and preamble sequence configuration could be provided to a UE by the network in a DL TCI list before a TCI switching based handover command. Since the DL TCI list includes DL beam information associated with SSB or CSI-RS, and RO information, thus the RO configuration could be associated with SSB or CSI-RS.

Referring back to Table 1, for each TCI in the DL TCI list, the RO information is associated with a specific SSB or CSI-RS. More specifically, the RO information may include one or more of the following:

RACH time domain configuration: periodicity, timing offset, and RACH timer, etc.
RACH frequency domain configuration: frequency domain position, and Frequency-Division Multiplexing (FDM) mode, etc.
Number of RACH: the number of RO per SSB/CSI-RS, and the number of preamble per SSB/CSI-RS, etc.
Power level of RACH: the power ramping step of RACH, etc.
Others According to embodiments of the present disclosure, the L1/L2 handover command includes a specified DL TCI related to the target cell (or respective TRP), and the RO information associated with the specified DL TCI in the DL TCI list may be determined as the RO information for RACH configuration.

As an example, a DL TCL switching based handover command indicates the UE to switch to TC #2, and the UE will use the RO information #1 to perform random access to the target cell (i.e., cell 2). That is, the UE will use the RO information #1 as the RACH information to perform access to the respective TRP in the target cell (i.e., TRP2).

BWP Information for RACH

For an L1/L2 handover based on DL TCI switching which indicates a specified DL TCI related to the target cell (or respective TRP), the following options for determining UL BWP for RACH to a target cell (or respective TRP) may be considered:

Option 1: the UL BWP for RACH to the target cell (or respective TRP) may be the same as the active UL BWP associated with the serving cell (or respective TRP);
Option 2: the UL BWP for RACH to the target cell (or respective TRP) may be the initial UL BWP associated with the specified DL TCI related to the target cell (or respective TRP) defined in the DL TCI list.

When Option 1 is adopted while the determined UL BWP of the target cell has no RACH resources, one of the following operations may be considered:

Operation 1: the UE may skip the RACH procedure, and directly reuse the same TA from the old serving cell;
Operation 2: the UE may automatically switch to the initial BWP of the target cell for RACH configuration, and then automatically switch to the active UL BWP of the target cell with a TA estimated from the initial BWP of the target cell;
Operation 3: Go back to Option 2.

It will be understood by those skilled in the art that in Frequency 1 (FR1), with the above-mentioned RO information and/or BWP information, a UE may successfully perform random access to a target cell (or respective TRP). In Frequency 2 (FR2), with the above-mentioned RO information and/or BWP information, UE may also need UL beam information (based on the aforementioned options) to successfully perform random access to a target cell (or respective TRP). UL beam information for RACH configuration is especially used for L1/L1 handover in FR2.

In summary, the present disclosure provides devices, methods and systems for RACH configuration in L1/L2 mobility. Based at least in part on a DL TCI list (which may include DL beam information, RO information and initial BWP information related to multiple cells (including the serving cell and the target cell) and a DL TCI switching based handover command indicating a specified DL TCI related to the TRP in the target cell, a UE may determine RACH information to perform random access to the TRP in the target cell. The present disclosure further provides specific methods and options for determining UL beam information, RO information and BWP information included in the RACH information. Compared to legacy L3 handover, the methods in the present disclosure based on L1/L2 handover may simplify the handover and RACH procedure, reduce overheads, and shorten the delay.

It will be appreciated that the above-mentioned L1/L2 handover method for RACH configuration may be used in inter-cell handover as described above (e.g., the first TRP and the second TRP are located in different cells as described above). Alternatively or additionally, the above method may also apply to intra-cell handover. For example, the first TRP and the second TRP could also be located in the same cell.

In the following further exemplary embodiments are provided.

One set of embodiments may include a user equipment (UE), comprising: at least one antenna; at least one radio coupled to the at least one antenna; and one or more processors coupled to the at least one radio; wherein the one or more processors are configured to cause the UE to: obtain a downlink (DL) Transmission Configuration Indicator (TCI) list from a first Transmission and Reception Point (TRP), wherein the DL TCI list includes DL beam information, Random Access Channel Occasion (RO) information, and initial Bandwidth Part (BWP) information associated with each DL TCI of a plurality of DL TCIs related to the first TRP and multiple TRPs adjacent to the first TRP; receive a handover command from the first TRP via Downlink Control Information (DCI) in Layer 1 (L1) or Media Access Control (MAC) Control Element (CE) in Layer 2 (L2), wherein the handover command indicates a handover from the first TRP to a second TRP of the multiple TRPs for the UE, and includes a specified DL TCI related to the second TRP; determine Random Access Channel (RACH) information related to the second TRP, based at least partly on the specified DL TCI related to the second TRP included in the handover command and the DL TCI list; and perform random access to the second TRP based on the RACH information related to the second TRP.

According to some embodiments, the RACH information includes uplink (UL) beam information for the UE to perform random access to the second TRP.

According to some embodiments, the one or more processors are further configured to cause the UE to: obtain an uplink (UL) Transmission Configuration Indicator (TCI) list or UL spatial relation information from the first TRP, wherein the UL TCI list or UL spatial relation information includes UL beam information associated with each UL TCI of a plurality of UL TCIs related to the first TRP and the multiple TRPs; and receive a specified UL TCI from the first TRP via DCI in L1 or MAC CE in L2, wherein the specified UL TCI is associated with one of Synchronization Signal Block (SSB), Channel State Information Reference Signal (CSI-RS) or Sounding Reference Signal (SRS); and wherein the UL beam information included in the UL TCI list or UL spatial relation information is based on a measurement of SSB, CSI-RS or SRS associated with the plurality of UL TCIs in the UL TCI list or UL spatial relation information.

According to some embodiments, in response to determining time elapsed since the measurement associated with the specified UL TCI was conducted does not exceed a time threshold, determining the UL beam information for the UE included in the RACH information is further based on the specified UL TCI and the UL TCI list or UL spatial relation information, and the UL beam information associated with the specified UL TC in the UL TC list or UL spatial relation information is determined as the UL beam information for the UE to perform random access to the second TRP.

According to some embodiments, the one or more processors are further configured to cause the UE to: in response to determining time elapsed since the measurement associated with the specified UL TCI was conducted exceeds a time threshold, perform beam tracking with respect to the second TRP based on one of SSB, CSI-RS or SRS associated with the specified UL TCI, wherein determining the UL beam information for the UE included in the RACH information is further based on the beam tracking, and wherein the UL beam information associated with the beam resulted from the beam tracking is determined as the UL beam information for the UE to perform random access to the second TRP.

According to some embodiments, the specified DL TCI is associated with one of Synchronization Signal Block (SSB) or Channel State Information Reference Signal (CSI-RS); and the DL beam information included in the DL TCI list is based on a measurement of SSB or CSI-RS associated with the plurality of DL TCIs in the DL TCI list.

According to some embodiments, in response to determining time elapsed since the measurement associated with the specified DL TCI was conducted does not exceed a time threshold, determining the UL beam information for the UE included in the RACH information is further based on beam correspondence, and the UL beam information corresponding to the DL beam information associated with the specified DL TCI related to the second TRP in the DL TCI list is determined as the UL beam information for the UE to perform random access to the second TRP.

According to some embodiments, the one or more processors are further configured to cause the UE to: in response to determining time elapsed since the measurement associated with the specified DL TCI was conducted exceeds a time threshold, perform beam tracking with respect to the second TRP based on one of SSB or CSI-RS associated with the specified DL TCI, wherein determining the UL beam information for the UE included in the RACH information is further based on the beam tracking, and wherein the UL beam information associated with the beam resulted from the beam tracking is determined as the UL beam information for the UE to perform random access to the second TRP.

According to some embodiments, the one or more processors are further configured to cause the UE to: perform beam sweeping with respect to the second TRP, wherein determining the UL beam information for the LIE included in the RACH information is further based on the beam sweeping, wherein the UL beam information associated with the beam resulted from the beam sweeping is determined as the UL beam information for the UE to perform random access to the second TRP, and wherein said beam enables the UE to receive random access response (RAR) from the second TRP.

According to some embodiments, the RACH information includes RO information for the UE to perform random access to the second TRP.

According to some embodiments, the RO information associated with the specified DL TCI related to the second TRP in the DL TCI list is determined as the RO information included in the RACH information.

According to some embodiments, the RO information included in the DL TCI list includes one or more of the following: RACH time domain configuration; RACH frequency domain configuration; number of RACH; and power level of RACH.

According to some embodiments, the RACH information includes BWP information for the UE to perform random access to the second TRP.

According to some embodiments, determining the BWP information included in the RACH information is further based on active uplink (UL) BWP associated with the first TRP, and the active UL BWP associated with the first TRP is determined as the BWP information for the UE to perform random access to the second TRP.

According to some embodiments, the initial BWP information associated with the specified DL TCI related to the second TRP in the DL TCI list is determined as the BWP information included in the RACH information for the UE to perform random access to the second TRP.

According to some embodiments, in response to determining that the determined BWP information associated with the second TRP has no RACH resource, the one or more processors are further configured to cause the UE to: skip RACH procedure, and reuse the same Timing Advance (TA) as the TA associated with the first TRP; or switch automatically to the initial BWP associated with the specified DL TCI related to the second TRP, and then switch automatically to active UL BWP associated with the second TRP with a TA estimated from the initial BWP information.

Another set of embodiments may include a method for a user equipment (UE), comprising: obtaining a downlink (DL) Transmission Configuration Indicator (TCI) list from a first Transmission and Reception Point (TRP), wherein the DL TCI list includes DL beam information, Random Access Channel Occasion (RO) information, and initial Bandwidth Part (BWP) information associated with each DL TCI of a plurality of DL TCIs related to the first TRP and multiple TRPs adjacent to the first TRP; receiving a handover command from the first TRP via Downlink Control Information (DCI) in Layer 1 (L1) or Media Access Control (MAC) Control Element (CE) in Layer 2 (L2), wherein the handover command indicates a handover from the first TRP to a second TRP of the multiple TRPs for the UE, and includes a specified DL TCI related to the second TRP; determining Random Access Channel (RACH) information related to the second TRP, based at least partly on the specified DL TCI related to the second TRP included in the handover command and the DL TCI list; and performing random access to the second TRP based on the RACH information related to the second TRP.

According to some embodiments, the RACH information includes uplink (UL) beam information for the UE to perform random access to the second TRP.

According to some embodiments, the method further comprises: obtaining an uplink (UL) Transmission Configuration indicator (TCI) list or UL spatial relation information from the first TRP, wherein the UL TCI list or UL spatial relation information includes UL beam information associated with each UL TC of a plurality of UL TCIs related to the first TRP and the multiple TRPs; and receiving a specified UL TC from the first TRP via DCI in L1 or MAC CE in L2, wherein the specified UL TC is associated with one of Synchronization Signal Block (SSB), Channel State Information Reference Signal (CSI-RS) or Sounding Reference Signal (SRS); and wherein the UL beam information included in the UL TCI list or UL spatial relation information is based on a measurement of SSB, CSI-RS or SRS associated with the plurality of UL TCIs in the UL TCI list or UL spatial relation information.

According to some embodiments, in response to determining time elapsed since the measurement associated with the specified UL TCI was conducted does not exceed a time threshold, determining the UL beam information for the UE included in the RACH information is further based on the specified UL TCI and the UL TCI list or UL spatial relation information, and the UL beam information associated with the specified UL TCI in the UL TCI list or UL spatial relation information is determined as the UL beam information for the UE to perform random access to the second TRP.

According to some embodiments, the method further comprises: in response to determining time elapsed since the measurement associated with the specified UL TC was conducted exceeds a time threshold, performing beam tracking with respect to the second TRP based on one of SSB. CSI-RS or SRS associated with the specified UL TCI, wherein determining the UL beam information for the UE included in the RACH information is further based on the beam tracking, and wherein the UL beam information associated with the beam resulted from the beam tracking is determined as the UL beam information for the UE to perform random access to the second TRP.

According to some embodiments, the specified DL TCI is associated with one of Synchronization Signal Block (SSB) or Channel State Information Reference Signal (CSI-RS); and the DL beam information included in the DL TCI list is based on a measurement of SSB or CSI-RS associated with the plurality of DL TCIs in the DL TCI list.

According to some embodiments, in response to determining time elapsed since the measurement associated with the specified DL TCI was conducted does not exceed a time threshold, determining the UL beam information for the UE included in the RACH information is further based on beam correspondence, and the UL beam information corresponding to the DL beam information associated with the specified DL TCI related to the second TRP in the DL TCI list is determined as the UL beam information for the UE to perform random access to the second TRP.

According to some embodiments, the method further comprises: in response to determining time elapsed since the measurement associated with the specified DL TCI was conducted exceeds a time threshold, performing beam tracking with respect to the second TRP based on one of SSB or CSI-RS associated with the specified DL TCI, wherein determining the UL beam information for the UE included in the RACH information is further based on the beam tracking, and wherein the UL beam information associated with the beam resulted from the beam tracking is determined as the UL beam information for the UE to perform random access to the second TRP.

According to some embodiments, the method further comprises: performing beam sweeping with respect to the second TRP, wherein determining the UL beam information for the UE included in the RACH information is further based on the beam sweeping, wherein the UL beam information associated with the beam resulted from the beam sweeping is determined as the UL beam information for the UE to perform random access to the second TRP, and wherein said beam enables the UE to receive random access response (RAR) from the second TRP.

According to some embodiments, the RACH information includes RO information for the UE to perform random access to the second TRP; and the RO information associated with the specified DL TCI related to the second TRP in the DL TCI list is determined as the RO information included in the RACH information.

According to some embodiments, the RO information included in the DL TCI list includes one or more of the following: RACH time domain configuration; RACH frequency domain configuration; number of RACH; and power level of RACH.

According to some embodiments, the RACH information includes BWP information for the UE to perform random access to the second TRP.

According to some embodiments, determining the BWP information included in the RACH information is further based on active UL BWP associated with the first TRP, and the active uplink (UL) BWP associated with the first TRP is determined as the BWP information for the UE to perform random access to the second TRP.

According to some embodiments, the initial BWP information associated with the specified DL TCI related to the second TRP in the DL TCI list is determined as the BWP information included in the RACH information for the UE to perform random access to the second TRP.

According to some embodiments, the method further comprises: in response to determining that the determined BWP information associated with the second TRP has no RACH resource, performing one of the following: skipping RACH procedure, and reuse the same Timing Advance (TA) as the TA associated with the first TRP; or switching automatically to the initial BWP associated with the specified DL TCI related to the second TRP, and then switching automatically to active UL BWP associated with the second TRP with a TA estimated from the initial BWP information.

Yet another exemplary embodiment may include an apparatus for operating a user equipment (UE), the apparatus comprising: a processor configured to cause the UE to perform any or all parts of any of the preceding examples.

A yet further exemplary embodiment may include a non-transitory computer-readable memory medium storing program instructions, where the program instructions, when executed by a computer system, cause the computer system to perform any or all parts of any of the preceding examples.

A still further exemplary embodiment may include a computer program product, comprising program instructions which, when executed by a computer, cause the computer to perform any or all parts of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method in embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
at least one antenna;
at least one radio coupled to the at least one antenna; and
one or more processors coupled to the at least one radio;
wherein the one or more processors are configured to cause the UE to:
  obtain a downlink (DL) Transmission Configuration Indicator (TCI) list from a first Transmission and Reception Point (TRP), wherein the DL TCI list includes DL beam information, Random Access Channel Occasion (RO) information, and initial Bandwidth Part (BWP) information associated with each DL TCI of a plurality of DL TCIs related to the first TRP and multiple TRPs adjacent to the first TRP;
  receive a handover command from the first TRP via Downlink Control Information (DCI) in Layer 1 (L1) or Media Access Control (MAC) Control Element (CE) in Layer 2 (L2), wherein the handover command indicates a handover from the first TRP to a second TRP of the multiple TRPs for the UE, and includes a specified DL TCI related to the second TRP;
  determine Random Access Channel (RACH) information related to the second TRP, based at least partly on the specified DL TCI related to the second TRP included in the handover command and the DL TCI list; and
  perform random access to the second TRP based on the RACH information related to the second TRP.

2. The UE of claim 1, wherein the RACH information includes uplink (UL) beam information for the UE to perform random access to the second TRP.

3. The UE of claim 2, wherein the one or more processors are further configured to cause the UE to:
obtain an uplink (UL) Transmission Configuration Indicator (TCI) list or UL spatial relation information from the first TRP, wherein the UL TCI list or UL spatial relation information includes UL beam information associated with each UL TCI of a plurality of UL TCIs related to the first TRP and the multiple TRPs; and
receive a specified UL TCI from the first TRP via DCI in L1 or MAC CE in L2,
wherein the specified UL TCI is associated with one of Synchronization Signal Block (SSB), Channel State Information Reference Signal (CSI-RS) or Sounding Reference Signal (SRS); and
wherein the UL beam information included in the UL TCI list or UL spatial relation information is based on a measurement of SSB, CSI-RS or SRS associated with the plurality of UL TCIs in the UL TCI list or UL spatial relation information.

4. The UE of claim 3, wherein:
in response to determining time elapsed since the measurement associated with the specified UL TCI was conducted does not exceed a time threshold, determining the UL beam information for the UE included in the RACH information is further based on the specified UL TCI and the UL TCI list or UL spatial relation information, and
the UL beam information associated with the specified UL TCI in the UL TCI list or UL spatial relation information is determined as the UL beam information for the UE to perform random access to the second TRP.

5. The UE of claim 3, wherein the one or more processors are further configured to cause the UE to:

in response to determining time elapsed since the measurement associated with the specified UL TCI was conducted exceeds a time threshold, perform beam tracking with respect to the second TRP based on one of SSB, CSI-RS or SRS associated with the specified UL TCI, wherein determining the UL beam information for the UE included in the RACH information is further based on the beam tracking, and wherein the UL beam information associated with the beam resulted from the beam tracking is determined as the UL beam information for the UE to perform random access to the second TRP.

6. The UE of claim 2, wherein:

the specified DL TCI is associated with one of Synchronization Signal Block (SSB) or Channel State Information Reference Signal (CSI-RS); and the DL beam information included in the DL TCI list is based on a measurement of SSB or CSI-RS associated with the plurality of DL TCIs in the DL TCI list.

7. The UE of claim 6, wherein:

in response to determining time elapsed since the measurement associated with the specified DL TCI was conducted does not exceed a time threshold, determining the UL beam information for the UE included in the RACH information is further based on beam correspondence, and the UL beam information corresponding to the DL beam information associated with the specified DL TCI related to the second TRP in the DL TCI list is determined as the UL beam information for the UE to perform random access to the second TRP.

8. The UE of claim 6, wherein the one or more processors are further configured to cause the UE to:

in response to determining time elapsed since the measurement associated with the specified DL TCI was conducted exceeds a time threshold, perform beam tracking with respect to the second TRP based on one of SSB or CSI-RS associated with the specified DL TCI, wherein determining the UL beam information for the UE included in the RACH information is further based on the beam tracking, and wherein the UL beam information associated with the beam resulted from the beam tracking is determined as the UL beam information for the UE to perform random access to the second TRP.

9. The UE of claim 2, wherein the one or more processors are further configured to cause the UE to:

perform beam sweeping with respect to the second TRP, wherein determining the UL beam information for the UE included in the RACH information is further based on the beam sweeping, wherein the UL beam information associated with the beam resulted from the beam sweeping is determined as the UL beam information for the UE to perform random access to the second TRP, and wherein said beam enables the UE to receive random access response (RAR) from the second TRP.

10. The UE of claim 1, wherein the RACH information includes RO information for the UE to perform random access to the second TRP.

11. The UE of claim 10, wherein the RO information associated with the specified DL TCI related to the second TRP in the DL TCI list is determined as the RO information included in the RACH information.

12. The UE of claim 1, wherein the RO information included in the DL TCI list includes one or more of the following:

RACH time domain configuration;

RACH frequency domain configuration;

number of RACH; and power level of RACH.

13. The UE of claim 1, wherein the RACH information includes BWP information for the UE to perform random access to the second TRP.

14. The UE of claim 13, wherein:

determining the BWP information included in the RACH information is further based on active uplink (UL) BWP associated with the first TRP, and the active UL BWP associated with the first TRP is determined as the BWP information for the UE to perform random access to the second TRP.

15. The UE of claim 13, wherein the initial BWP information associated with the specified DL TCI related to the second TRP in the DL TCI list is determined as the BWP information included in the RACH information for the UE to perform random access to the second TRP.

16. The UE of claim 14, wherein in response to determining that the determined BWP information associated with the second TRP has no RACH resource, the one or more processors are further configured to cause the UE to:

skip RACH procedure, and reuse the same Timing Advance (TA) as the TA associated with the first TRP; or switch automatically to the initial BWP associated with the specified DL TCI related to the second TRP, and then switch automatically to active UL BWP associated with the second TRP with a TA estimated from the initial BWP information.

17. A method for a user equipment (UE), comprising:

obtaining a downlink (DL) Transmission Configuration Indicator (TCI) list from a first Transmission and Reception Point (TRP), wherein the DL TCI list includes DL beam information, Random Access Channel Occasion (RO) information, and initial Bandwidth Part (BWP) information associated with each DL TCI of a plurality of DL TCIs related to the first TRP and multiple TRPs adjacent to the first TRP;

receiving a handover command from the first TRP via Downlink Control Information (DCI) in Layer 1 (L1) or Media Access Control (MAC) Control Element (CE) in Layer 2 (L2), wherein the handover command indicates a handover from the first TRP to a second TRP of the multiple TRPs for the UE, and includes a specified DL TCI related to the second TRP;

determining Random Access Channel (RACH) information related to the second TRP, based at least partly on the specified DL TCI related to the second TRP included in the handover command and the DL TCI list; and performing random access to the second TRP based on the RACH information related to the second TRP.

18. The method of claim 17, wherein the RACH information includes uplink (UL) beam information for the UE to perform random access to the second TRP.

19. The method of claim 18, further comprising:

obtaining an uplink (UL) Transmission Configuration Indicator (TCI) list or UL spatial relation information from the first TRP, wherein the UL TCI list or UL spatial relation information includes UL beam information associated with each UL TCI of a plurality of UL TCIs related to the first TRP and the multiple TRPs; and receiving a specified UL TCI from the first TRP via DCI in L1 or MAC CE in L2, wherein the specified UL TCI is associated with one of Synchronization Signal Block (SSB), Channel State Information Reference Signal (CSI-RS) or Sounding Reference Signal (SRS); and wherein the UL beam information included in the UL TCI list or UL spatial relation information is based on a measurement of SSB, CSI-RS or SRS associated with the plurality of UL TCIs in the UL TCI list or UL spatial relation information.

20. The method of claim 19, wherein:

in response to determining time elapsed since the measurement associated with the specified UL TCI was conducted does not exceed a time threshold, determining the UL beam information for the UE included in the RACH information is further based on the specified UL TCI and the UL TCI list or UL spatial relation information, and the UL beam information associated with the specified UL TCI in the UL TCI list or UL spatial relation information is determined as the UL beam information for the UE to perform random access to the second TRP.

\* \* \* \* \*